United States Patent [19]

Mantoux

[11] 4,091,670

[45] May 30, 1978

[54] PUSH-BUTTON OPERATED METER

[75] Inventor: Gérard Mantoux, Bois d'Arcy, France

[73] Assignee: Bertin & Cie, Plaisir, France

[21] Appl. No.: 734,016

[22] Filed: Oct. 19, 1976

Related U.S. Application Data

[63] Continuation of Ser. No. 560,379, Mar. 20, 1975, abandoned.

[30] Foreign Application Priority Data

Mar. 21, 1974 France .............................. 74 09607

[51] Int. Cl.² .............................................. G01F 23/16
[52] U.S. Cl. ........................................ 73/302; 417/63
[58] Field of Search .............. 73/302, 303, 301, 425.6; 200/83 WM; 417/571, 63; 137/558, 557

[56] References Cited

U.S. PATENT DOCUMENTS

| 1,255,034 | 1/1918 | Mason | 260/83 WM X |
|---|---|---|---|
| 1,711,507 | 5/1929 | Titterington | 73/302 |
| 2,302,923 | 11/1942 | Zimarik | 200/83 WM |
| 2,728,070 | 12/1955 | Kelly | 73/303 X |
| 3,362,224 | 1/1968 | Melone | 73/327 |
| 3,498,141 | 3/1970 | Nelson et al. | 73/302 X |
| 3,525,264 | 8/1970 | Nieglos et al. | 73/425.6 |
| 3,622,251 | 11/1971 | Allen | 417/571 |
| 3,834,236 | 9/1974 | Durin | 73/302 |
| 3,938,549 | 2/1976 | Nunneley | 137/557 |

*Primary Examiner*—Daniel M. Yasich
*Attorney, Agent, or Firm*—A. W. Breiner

[57] ABSTRACT

A liquid level gauge or like meter designed to provide a reading of prolonged duration, is operated by means of a push-button which, upon depression by exertion of a push on its head, activates the basic sensor element of the meter which controls its index. The latter is located inside the push-button, under the head thereof which protects it against shocks and soil; it can be viewed through this head which is of transparent material. The index has a section which is carried by the transparent head of the push-button and is movable therewith. The required prolonged duration readability of the index is available after release of the push-button head.

4 Claims, 3 Drawing Figures

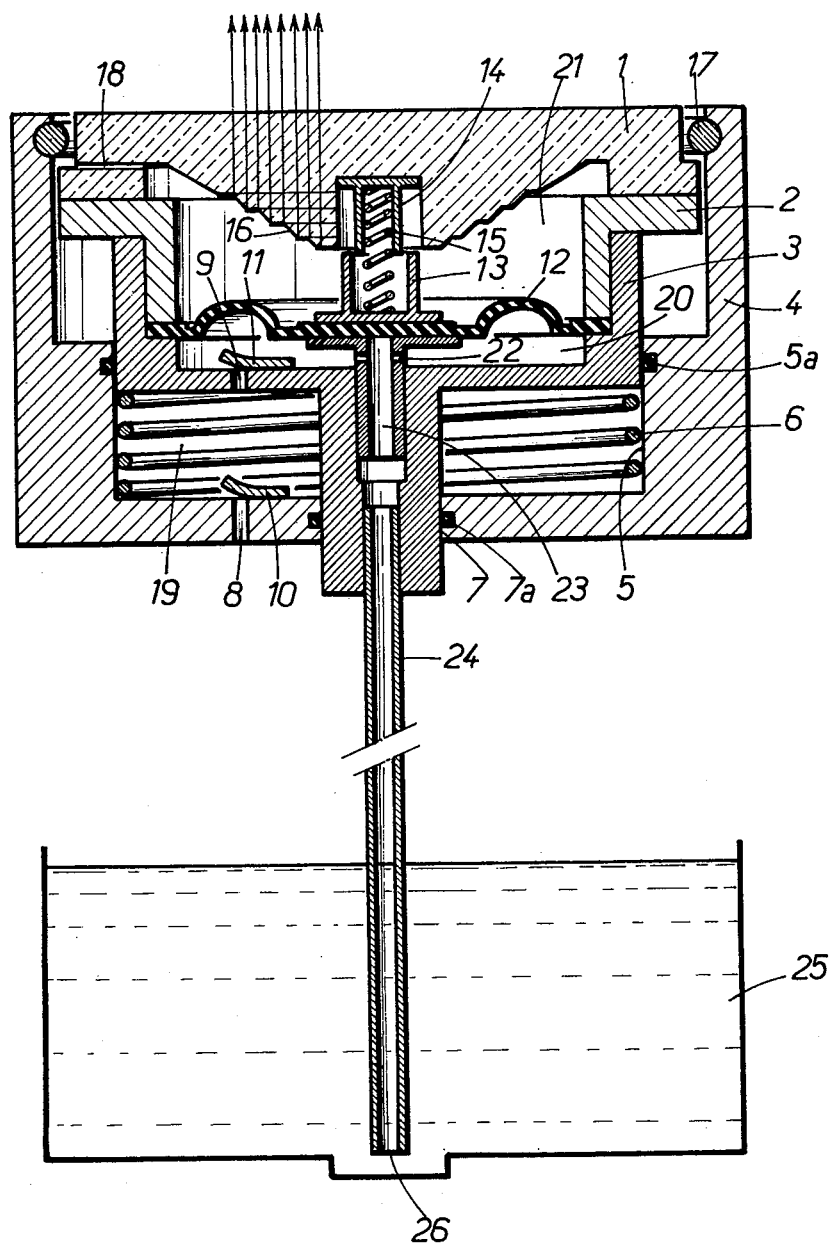
FIG.: 1

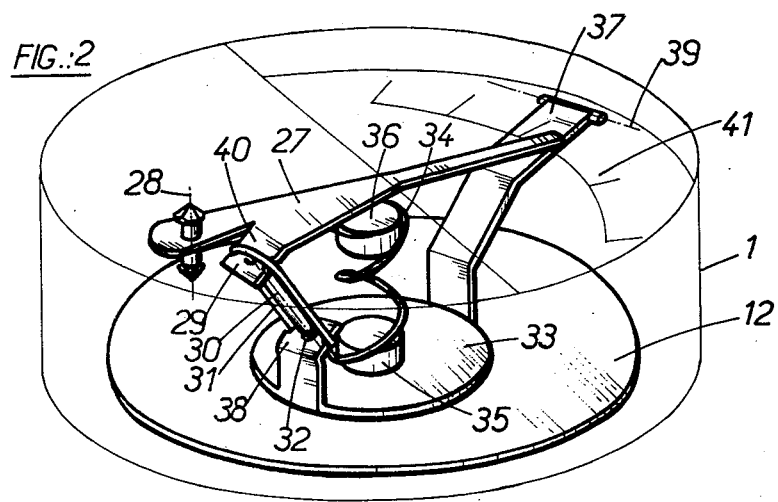
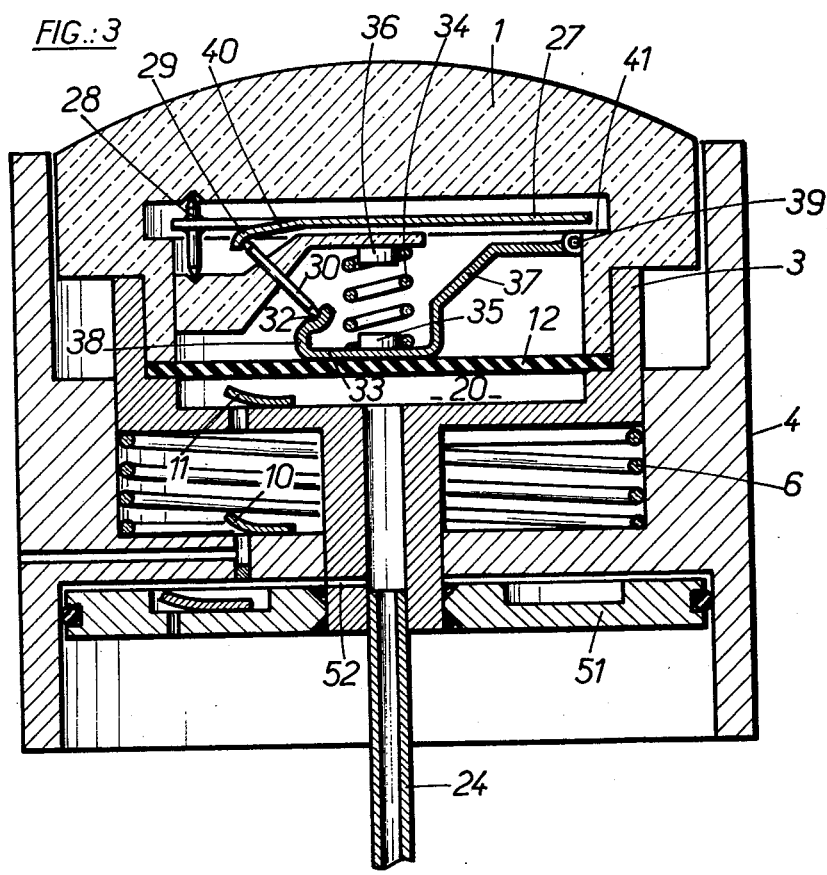

PUSH-BUTTON OPERATED METER

This is a continuation of application Ser. No. 560,379 filed Mar. 20, 1975, now abandoned.

The present invention relates to the combination of a measuring device with a push-button, said measuring device being located within the movable part of the push-button and being functionally dependent from the position of the push-button.

In the prior art a number of push-buttons are already known which indicate their "on" or "off" position for instance by-being being luminous. In such manner compactness is improved, which is advantageous for control panels of machinery or the like.

Similar results are obtained with the device of the present invention and, accordingly, the primary object of the present invention is to provide a device wherein a meter or measuring instrument is combined with a push-button, and more specifically wherein the index of the meter is combined with the movable part or head of the push-button.

A further object of the present invention is to provide a device with a transparent head which overlies the index so that the latter is visible through the head and is protected thereby against shocks and soil.

A still further object of this invention is to design a device with the push-button head carrying a section of the index so that both parts move jointly. Section 14 is part of a tube attached to the piston 1, section 13 is positioned on top of the diaphragm.

Another object of the present invention is to provide a device of the afore-mentioned design, in which the meter or measuring instrument is a liquid level gauge having an optical reading device incorporated in the push-button.

The following description is concerned, by way of example, with a liquid gauge according to the invention, which comprises in particular an optic reading device incorporated therein, for reading measured quantities.

Said gauge indicates the liquid level in a storage tank. Its principle, in itself known, is based on the measure of the hydrostatic pressure applied at the end of a flexible or rigid tube that transmits this pressure through pneumatic means to a reading manometer. If the end of this tube is connected to the lowest point of the tank, the relative pressure read from the manometer is proportional to the liquid height in the tank.

Said gauge is of coaxial construction and comprises a movable part or indicator which is used as a press-button key for energizing a pneumatic pump that is provided for filling up with gas the pressure transmitting tube.

Now a non limiting embodiment of the invention will be described with reference to the drawings.

FIG. 1 shows in axial section a liquid height measuring device according to the invention.

FIG. 2 and 3 show a modification thereof, in perspective and axial section respectively.

The device of FIG. 1 comprises a piston including a push-button head 1 made of transparent material and two parts 2 and 3 slidable in a body 4.

Piston 1 is repelled upwards by a spring 6, but its movement is restricted by circlip 17. The parts 1, 2 and 3 could be made of one piece of material.

Member 3 is guided along boxes 5 and 7 either with small clearances or tight seals 5a and 7a and extends with a tube 24, which is preferably flexible and of a small diameter. This tube ensures the connection of the device with the tank 25 in which the measurements are to be effected, in such manner that the free end 26 of the tube opens close to the bottom of tank 25.

A flexible diaphragm 12, made of a thin sheet of metal or elastomer, is clipped hermetically between parts 2 and 3 so as to define an inner chamber 20. If necessary diaphragm 12 is guided by a tube 23 pierced with holes 22 which establish a communication between chamber 20 and tube 24.

Part 3 and body 4 bond together a pneumatic pump chamber 19 having an inlet port 8 and an outlet port 9 which respectively open to the atmosphere and into chamber 20 and which are respectively controlled by check valves operating by means of flaps 10 and 11. The top face of diaphragm 12 bounds an outer chamber 21 which is vented to the atmosphere via a vent 18, and carries an indicating device with an index formed of two sections 13-14 urged apart by a small spring 15 interposed therebetween.

At rest atmospheric air fills the chambers 19, 20, 21; diaphgram 12, which separates the two chambers 20 and 21, is submitted to an equal pressure on both sides, and spring 15 is relaxed. A push which is exerted on the top side of part 1 and is transmitted from part 2 to piston 3 has for its effect to reduce the volume of chamber 19 in which air is compressed, while spring 6 is contracted. It results that the flap 10 is pushed flat over aperture 8. Consequently, as pressure within chamber 19 increases, this pressure is transmitted through aperture 9 and flap 11 is lifted. Thus the air trapped in chamber 19 is transferred to chamber 20. It is to be remarked that the sum of the volumes of chamber 20 and tube 24 is noticeably inferior to that of chamber 19.

Thus pressure in chamber 20 is increased and air passes via holes 22 and tube 23 into tube 24. In the latter the liquid contained is evacuated. Pressure exerted both in tube 24 and chamber 20 is then equal to ambient pressure plus hydrostatic pressure in tank 25, at the free end 26 of tube 24. Then the user releases his effort on press-button 1 and spring 6 returns piston 3 to its uppermost position. Thus a pressure drop is created in chamber 19 and this folds back flap 11 over aperture 9 and opens valve 10, which permits a renewed admission of ambient air, through aperture 8, into chamber 19. Chamber 20 is then closed and the gas contained therein is still subjected to the hydrostatic pressure of the end 26 of tube 24. Thus diaphragm 12 is submitted to a differential pressure, for pressure in chamber 20 is superior to pressure in chamber 21 by a quantity which is equal to the liquid head in tank 25 above free end 26 of tube 24.

In consequence diaphragm 12 is urged by a force which is balanced by the measurement spring 15. The movable index section 13 moves then upwards and more or less screens the fixed index section 14 according to pressure in chamber 20.

The material of part 1 is a transparent substance which may be colored and its faces are polished. The inner side of head part 1 is formed of a succession of frustums of pyramids or cones of 45° half-vertex angle; this inner side therefore looks like a stepped pyramid or cone 16 embodied in part 1. If the refraction index of the material of part 1 is superior to 1.414, every light ray which travels in the solid material of part 1, parallel to the axis of the truncated pyramids or cones will be totally reflected by the walls thereof (as in a total reflection prism) and will follow its route in part 1 perpendicularly to the axis, and conversely (as illustrated).

Assuming the top face of part 1 is perpendicular to the axis of the truncated pyramids the ray will proceed parallel to said axis.

Thus in the direction of the axis of the truncated pyramids the movable index section 13 will be seen through total reflection as concentric bands or annuli. If the index sections 14 and 13 present very contrasted colorations, for instance 13 being phosphorescent yellow and 14 dull black, the walls of the truncated pyramids will be seen in the color of the one of the two index sections facing each of them. Thus the more the movable index section 13 over the fixed index sections 14, the larger the number of yellow walls of truncated pyramids.

In the case of truncated cones, the indication will appear in the form of circles standing out on a black background. The face of the push-button 1 which is adapted to be depressed may naturally have a bulging shape so as to constitute a lens for magnifying the optical image described above.

In the modification shown on FIGS. 2 and 3 only the parts above diaphragm 12 are represented in FIG. 2.

A vane 33 lies on the flat portion of diaphragm 12 and biassedly spring 34, which is axially located by studs 35 and 36. This vane 33 is formed with or carries two tongues 37 and 38. The end of tongue 37 remote from vane 33 is attached to press-button 1 in pivotable manner about a hinge 39 which is inserted through extensions of tongue 37. Thus the whole member 37-33-38 may pivot about hinge 39. The tongue 38 has an integral concave thrust bearing 32. A pointer 27, which is carried on a pivot 28, may turn about the latter. This pointer is formed with a crank part 40 in which a hollowed-out bearing 29 is formed opposite thrust bearing 32. The pointed ends of a slanting push-rod 30 are maintained in engagement with the respective thrust bearings 29, 32 by means of a resilient is contrived, facing element 31. Thus the distance between the points 29 and 32 is kept constant. Under the effect of pressure in chamber 20, vane 33 and thrust bearing 32 are lifted by swinging about hinge 39. This entains angular displacement of thrust bearing 29 about pivot 28 to maintain this distance equal to the length of pushrod 30. Accordingly pointer 27 is swept over an angle.

Graduations 41, for instance etched-out marks, may be provided on the push-button surface for reading the indications of the pointer.

Reading is facilitated thanks to the bulging shape of push-button 1 which thereby acts as a magnifying lens.

As a supplemental improvement in the liquid guage of the invention a particular arrangement is shown in FIG. 3. In this arrangment, in addition to the already described pump piston 3 which works under the control of push-button 1, so as to oust the liquid contained in the measuring tube 24, a second pump piston 51 is provided and is actuated by spring 6 when the push-button rises again, but with a delay obtained by means of a very narrow dash-pot passage 52. In this manner, at the time of the slow rising of the push-button a very small flow is injected through said passage 52 into the measuring tube 24; eventual leaks, in particular those at the valve 11, are thus compensated and the indication given by the device will be stationary.

It will be remarked that, as passage 52 of the second pump 51 is very narrow, it will not, upon actuation of push-button 1, give rise to an appreciable leak which would impair the initial evacuation of tube 24 by means of piston 3.

I claim:

1. A liquid level gauge of the kind providing a lasting visual reading upon hand actuation of a liquid head measuring sensor, said gauge comprising a complex which includes relatively movable index means controlled by said sensor and providing said visual reading, said measuring sensor comprising a flexible diaphragm and a liquid head sensing tube operatively associated with said diaphragm, and a push-button which overlies said index means and carries a portion of the same in the inside of said push-button, said push-button having a transparent depressible actuator head, a stationary body, a first part fast with said depressible head, a second part fast with said first part, said flexible diaphragm being gripped peripherally between said parts and defining with said second part a pressure chamber into which said sensing tube opens, said second part being sealingly guided for slidable movement with respect to said stationary body and defining therewith piston pump chamber, and valve means carried by said second part for controllably communicating said chambers with each other, whereby said index means is visible through said overlying transparent head which shields it from shocks and soil, and is moreover movable jointly with said index means carrying head.

2. A liquid level gauge as claimed in claim 1, wherein said second part carries said liquid head sensing tube.

3. A liquid level gauge as claimed in claim 1, wherein said stationary body, said depressible head, and said first and second parts are each of general revolution shape and are fitted in substantially coaxial relationship.

4. A liquid level gauge as claimed in claim 3, wherein said transparent depressible head presents a bulging side and is adapted to constitute a magnifying lens for the image of said index means which it overlies.

* * * * *